(12) United States Patent
Tang (10) Patent No.: US 11,810,605 B2
(45) Date of Patent: Nov. 7, 2023

(54) MAGNETIC RECORDING MEDIA WITH TUNGSTEN PRE-SEED LAYER

(71) Applicant: Western Digital Technologies, Inc., San Jose, CA (US)

(72) Inventor: Kai Tang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/488,703

(22) Filed: Sep. 29, 2021

(65) Prior Publication Data

US 2023/0099090 A1 Mar. 30, 2023

(51) Int. Cl.
*G11B 5/667* (2006.01)
*G11B 5/84* (2006.01)
*G11B 5/73* (2006.01)

(52) U.S. Cl.
CPC .............. *G11B 5/667* (2013.01); *G11B 5/737* (2019.05); *G11B 5/7379* (2019.05); *G11B 5/8404* (2013.01)

(58) Field of Classification Search
CPC ......... G11B 5/84; G11B 5/8404; G11B 5/667; G11B 5/737; G11B 5/7367; G11B 5/7379
See application file for complete search history.

(56) References Cited

U.S. PATENT DOCUMENTS

| 6,863,993 | B1 | 3/2005 | Doerner et al. |
| 7,300,713 | B2 | 11/2007 | Bian et al. |
| 7,470,475 | B2 | 12/2008 | Ajan |
| 9,990,940 | B1* | 6/2018 | Kang ................... G11B 5/7379 |
| 2002/0164506 | A1 | 11/2002 | Bian et al. |
| 2004/0258925 | A1 | 12/2004 | Lee et al. |
| 2006/0234089 | A1 | 10/2006 | Hintz |
| 2015/0206547 | A1* | 7/2015 | Iwasaki ................. C23C 14/185 |
| | | | 428/828 |

(Continued)

OTHER PUBLICATIONS

Chen, Qixu et al., "Effect of Cr sub-seed layer thickness on the crystallographic orientation of Co-alloy recording media on glass", IEEE Transactions on Magnetics; Sep. 1999; vol. 35, Issue 5; 3 pages (2637-2639); https://ieeexplore.ieee.org/document/800923.

(Continued)

*Primary Examiner* — Holly Rickman
(74) *Attorney, Agent, or Firm* — LOZA & LOZA, LLP; Gabriel Fitch (57) ABSTRACT

Various apparatuses, systems, methods, and media are disclosed to provide a magnetic recording medium with a tungsten (W) pre-seed layer. The W pre-seed layer has a higher conductance than a CrTi pre-seed layer with a similar thickness. In one embodiment, the W pre-seed layer is made of about 95 atomic percent or more of W. The W pre-seed layer has lower electrical resistivity than the CrTi pre-seed layer. As a result, the thickness of the W pre-seed layer can be reduced as compared to the thickness of a CrTi pre-seed layer if a similar conductance is to be achieved. The magnetic recording materials deposited on top of the W pre-seed layer with the reduced thickness provide comparable crystallographic orientation and recording performance to those deposited on top of a thicker CrTi pre-seed layer with a similar conductance.

17 Claims, 10 Drawing Sheets

(56) References Cited

U.S. PATENT DOCUMENTS

2016/0155460 A1* 6/2016 Srinivasan ........... G11B 5/7369
 204/192.1
2018/0040346 A1* 2/2018 Moriya .................. C23C 14/35

OTHER PUBLICATIONS

Shimatsu, T. et al., "Ku2 magnetic anisotropy term of CoPtCr—SiO2 media for high density recording", Journal of Applied Physics; May 16, 2005; https://doi.org/10.1063/1.1851918; 4 pages.

* cited by examiner

MAGNETIC RECORDING MEDIA WITH TUNGSTEN PRE-SEED LAYER

FIELD

The disclosure relates, in some aspects, to magnetic recording media for use with magnetic recording devices, and more particularly, to magnetic recording media with a pre-seed layer made of tungsten (W).

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate, a pre-seed layer may be deposited on the non-conductive substrate so that a bias voltage can be applied during the deposition of some or all of the subsequent media films to form the magnetic storage media. The pre-seed layer should have sufficient electrical conductance to facilitate the deposition processes.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium includes a rigid substrate, a pre-seed layer on the rigid substrate, an amorphous soft magnetic underlayer (SUL) on the pre-seed layer, a seed layer on the amorphous SUL, and a magnetic recording layer (MRL) on the seed layer. The pre-seed layer includes W. In one aspect, a resistivity of the pre-seed layer is $12\times10^{-8}$ ohm meter ($\Omega \cdot m$) or less. In one aspect, a thickness of the pre-seed layer is less than 30 nm, for example, 14 nm or less.

In another embodiment, a data storage device includes a slider including a magnetic head and the magnetic recording medium described above. The slider is configured to write information to the magnetic recording layer of the magnetic recording medium.

In another embodiment, a method for manufacturing a magnetic recording medium is provided. The method provides a rigid substrate and a pre-seed layer on the rigid substrate. The pre-seed layer includes W. The method further provides an amorphous soft magnetic underlayer (SUL) on the pre-seed layer. The method further provides a seed layer on the amorphous SUL. The method further provides a magnetic recording layer (MRL) on the seed layer. The method further includes at least one of polishing the pre-seed layer or oxidizing the pre-seed layer.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In a similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for magnetic storage devices. Some magnetic recording media use a non-conducting substrate, for example, glass and ceramics. In this case, a pre-seed layer can be deposited on the non-conductive substrate so that a bias voltage can be applied to the substrate during the deposition of subsequent media films on the substrate. In some examples, a pre-seed layer can be made of a metal alloy including Cr and Ti with or without additional elements. In general, a CrTi pre-seed layer may need to be relatively thick (e.g., 30 to 60 nm) in order to provide sufficient conductance for application of the bias voltage during the deposition of subsequent media films on the substrate. However, forming a thick pre-seed layer can involve multiple deposition stations (which may be limited by the deposition machine), which can increase manufacturing costs. Furthermore, forming a thick pre-seed layer may result in high particle generation and fast exhaustion of the target material during the deposition processes.

Some aspects of the disclosure relate to magnetic recording media with a pre-seed layer made of tungsten (W). The W pre-seed layer has higher conductance than a CrTi pre-seed layer with a similar thickness. In one embodiment, the W pre-seed layer is made of about 95 atomic percent or more of W. The W pre-seed layer has lower electrical resistivity than a CrTi pre-seed layer. As a result, the thickness of the W pre-seed layer can be reduced as compared to the thickness of a CrTi pre-seed layer if a similar conductance is to be achieved.

Figure 1:
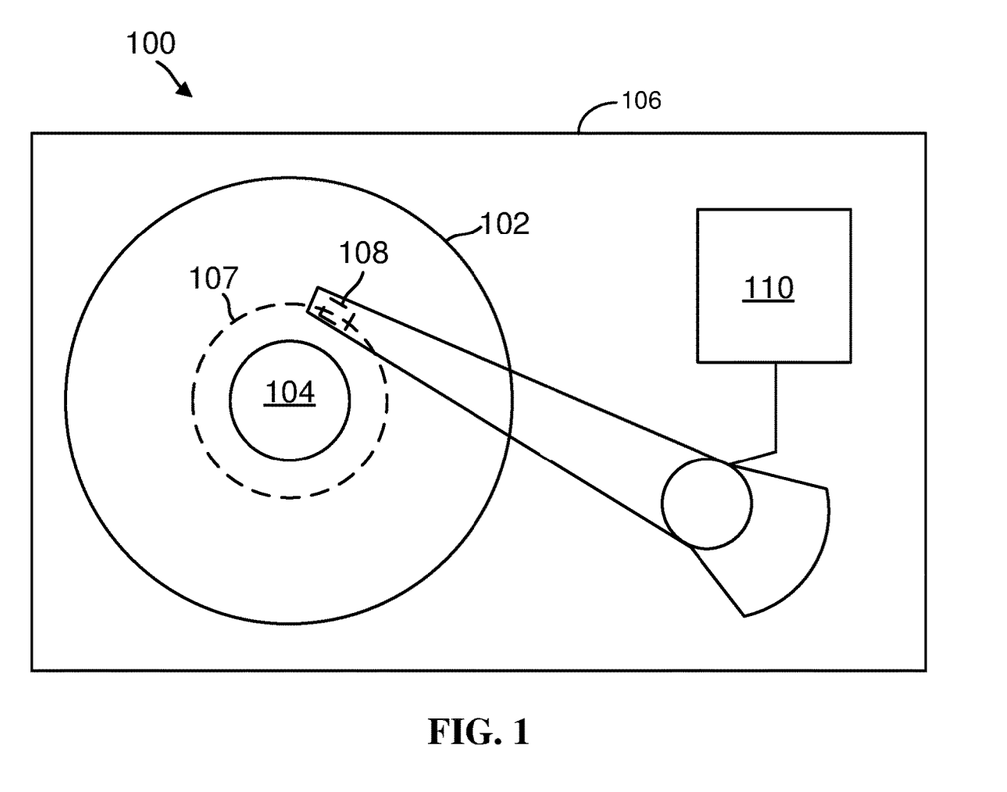
FIG. 1 is a top schematic view of a disk drive configured for magnetic recording including a slider and a magnetic recording medium with a tungsten pre-seed layer in accordance with one aspect of the disclosure.

FIG. 1 is a top schematic view of a data storage device 100 (e.g., disk drive or magnetic recording device) configured for magnetic recording comprising a slider 108 and a magnetic recording medium 102 according to one or more aspects of the disclosure. The data storage device 100 may include one or more disks/media 102 to store data. The Disk/media 102 resides on a spindle assembly 104 that is mounted to a drive housing 106. Data may be stored along tracks in the magnetic recording layer of disk 102. The reading and writing of data are accomplished with the head 108 (slider) that may have both write element (e.g., writer 108a) and read element (e.g., reader 108b). The write element 108a is used to alter the properties of the magnetic recording layer of disk 102 and thereby write information thereto. In one aspect, the head 108 may have magneto-resistive (MR) based elements, such as tunnel magnetoresistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). Some embodiments of the data storage device 100 are HAMR (heat assisted magnetic recording), EAMR (energy assisted magnetic recording), or non-EAMR magnetic data recording systems, including perpendicular magnetic recording (PMR) and shingled magnetic recording (SMR) disk drives or magnetic tape drives.

Figure 2:
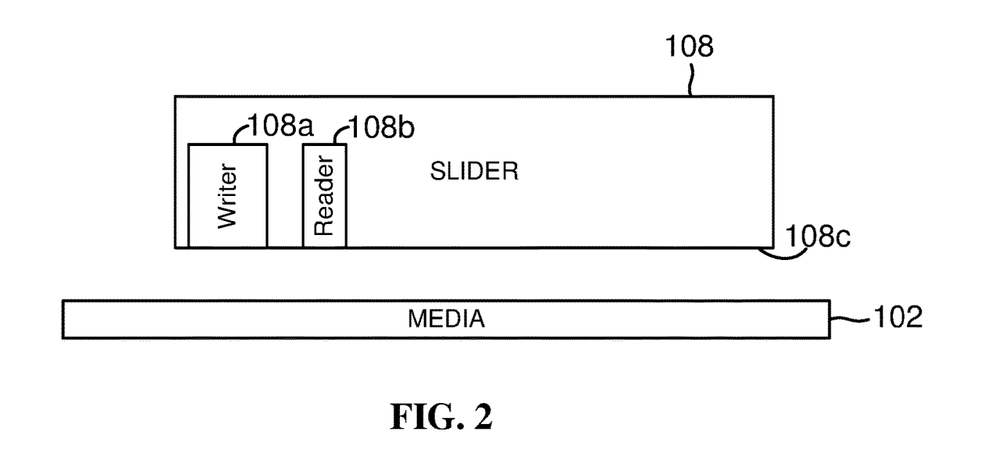
FIG. 2 is a side schematic view of the slider and magnetic recording medium of FIG. 1 in accordance with one aspect of the disclosure.

FIG. 2 is a side schematic view of the slider 108 and magnetic recording medium 102 of FIG. 1. The magnetic recording medium 102 may have a pre-seed layer (e.g., such as pre-seed layer 304 shown in FIG. 3) made of W (e.g., 95 or more atomic percent) in accordance with one or more aspects of the disclosure. The slider 108 includes a write element (e.g., writer) 108a and a read element (e.g., reader) 108b positioned along an air bearing surface (ABS) 108c of the slider for writing information to, and reading information from, respectively, the media 102.

Figure 3:
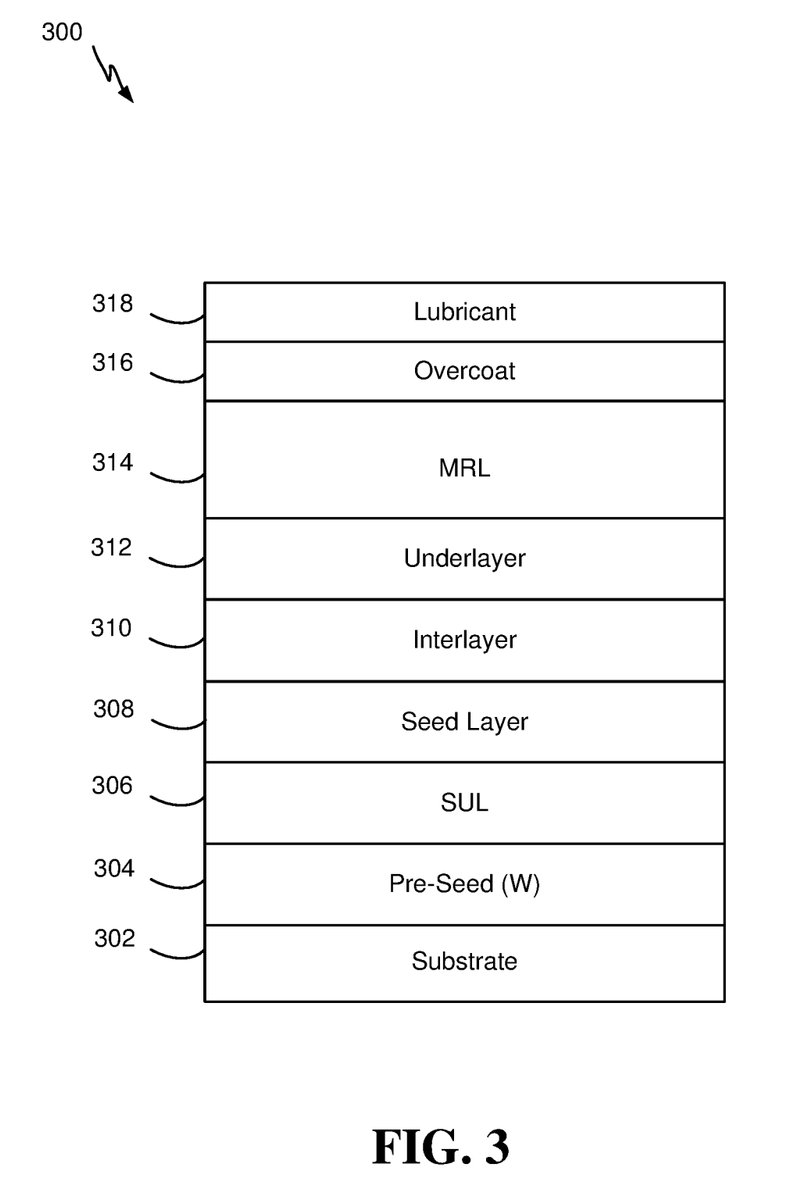
FIG. 3 is a side schematic view of a magnetic recording medium with a tungsten (W) pre-seed layer in accordance with one aspect of the disclosure.

FIG. 3 is a side schematic view of a magnetic recording medium 300 with a W pre-seed layer in accordance with one aspect of the disclosure. In some embodiments, the magnetic recording medium 300 may be a PMR, SMR, MAMR, or HAMR medium. The magnetic recording medium 300 has a stacked structure with a substrate 302 at a bottom/base layer, a pre-seed layer 304 on the substrate 302, an amorphous soft magnetic underlayer (SUL) 306 on the pre-seed layer 304, a seed layer 308 on the SUL 306, an interlayer 310 on the seed layer 308, an underlayer 312 on the interlayer 310, a magnetic recording layer (MRL) 314 on the underlayer 312, an overcoat layer 316 on the MRL 314. In some embodiments, the medium 300 may have a lubricant layer 318 on the overcoat layer 316.

In some aspects, the substrate 302 may be made of one or more materials such as an Al alloy, NiP plated Al, glass, glass ceramic, and/or combinations thereof. In one embodiment, the substrate 302 may be a rigid substrate (e.g., glass or ceramic). In some aspects, the pre-seed layer 304 may be made of a material with a suitably low resistivity for applying a bias voltage when using a non-conductive substrate (e.g., glass or ceramic).

In one aspect, the pre-seed layer 304 may be made of W, for example, about 95 or more atomic percent of W. Tungsten is a relatively hard material that makes it suitable as a pre-seed layer that can enhance the scratch resistance of the magnetic recording media built on top of it. Furthermore, W has a low electric resistivity. Therefore, a thin pre-seed layer made of W can still provide sufficient electric conductance for bias voltage application during the deposition of subsequent media films. In one example, the resistivity of the W pre-seed layer 304 may be about $12 \times 10^{-8}$ ohm meter ($\Omega \cdot m$) or less. In one example, a thickness of the W pre-seed layer 304 may be less than about 30 nm, in particular, less than about 14 nm while still providing sufficient conductance for bias voltage application during the fabrication of the magnetic recording medium 300. In general, the conductance of the W pre-seed layer 304 is higher than the conductance of a pre-seed layer made of a metal alloy (e.g., CrTi) with similar thickness. In one example, the W pre-seed layer 304 with a thickness of about 13.7 nm can provide sufficient conductance to apply a bias voltage for subsequent media films in a similar manner to a CrTi pre-seed layer with a thickness of about 57.9 nm. In this case, the thickness of the W pre-seed layer 304 can be reduced by about 75% as compared to a CrTi pre-seed layer, while the magnetic recording media deposited on top of the W pre-seed layer and the CrTi pre-seed layer have comparable crystallographic orientation and recording performance.

In some aspects, the amorphous SUL 306 may be made of materials with high permeability, high saturation magnetization and low coercivity such as CoFe, and one or more elements selected from the group consisting of Mo, Nb, Ta, W, B, Zr, and combinations thereof. In some aspects, the seed layer 308 may be made of any suitable materials known in the art. The seed layer 308 has a certain lattice structure and crystallographic orientation that can determine the crystallographic orientation of a layer (e.g., interlayer 310) grown/deposited on the seed layer 308. In one embodiment, the seed layer 308 may be made of Ni alloys. In one embodiment, the seed layer 308 may be made of Ru and Al with or without additional elements and/or oxides. In some aspects, the MRL 314 may be made of a CoPt alloy with or without additional other elements or oxides. In some aspects, the MRL 314 may be made of FePt or an alloy selected from FePtX, where X is a material selected from Cu, Ni, and combinations thereof. In some examples, the crystallographic orientation of the MRL 314 can facilitate PMR, SMR, MAMR, or HAMR. In some aspects, the overcoat layer 316 may be made of carbon. In some aspects, the lubricant layer 318 may be made of a polymer-based lubricant. In some aspects, the MRL 314 may include one or more recording layers that can be interleaved with exchange control layers. The recording layers may have the same thickness or different thicknesses.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Figure 4:
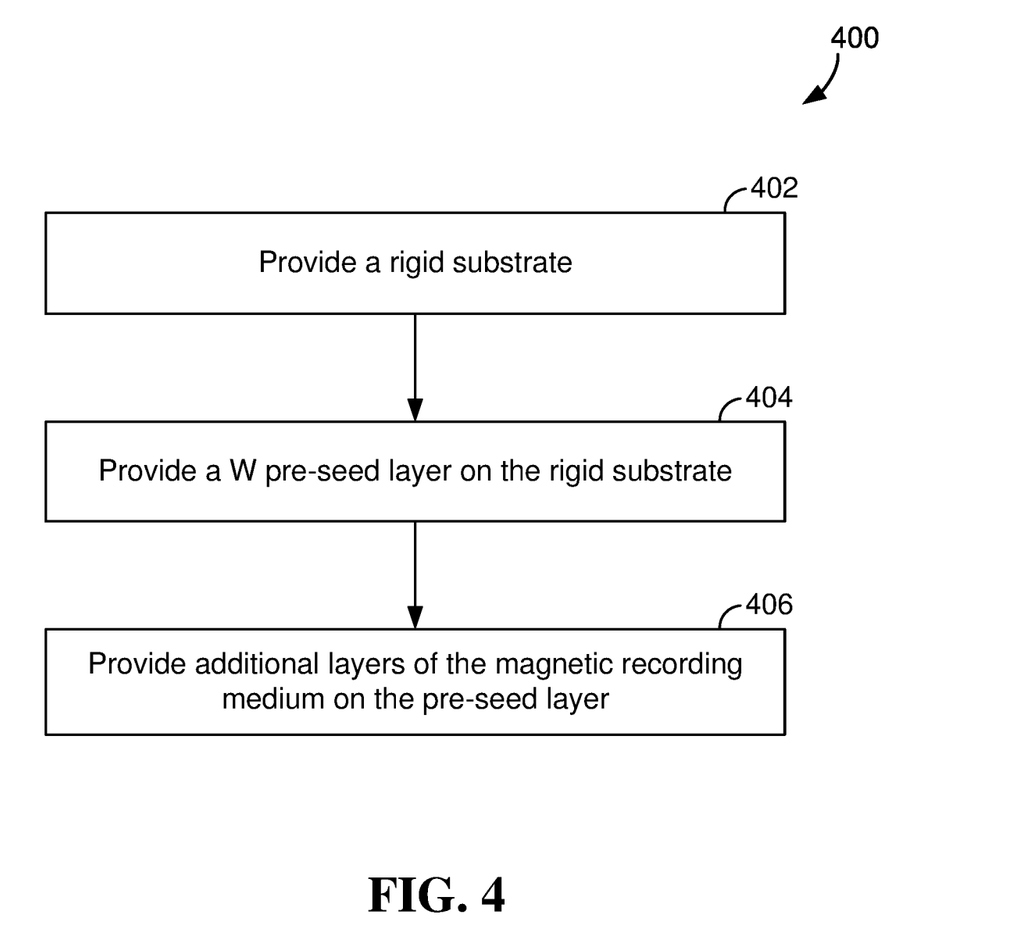
FIG. 4 is a flowchart illustrating a first process for fabricating a magnetic recording medium with a pre-seed layer made of W in accordance with some aspects of the disclosure.

FIG. 4 is a flowchart of a process 400 for fabricating a magnetic recording medium with a W pre-seed layer in accordance with some aspects of the disclosure. In one aspect, the process 400 can be used or modified to fabricate the medium described above in relation to FIG. 3. In some aspects, the fabricated medium may be used in the data storage device 100 of FIG. 1.

In block 402, the process provides a rigid substrate (e.g., rigid substrate 302). In some aspects, the substrate can be made of one or more materials such as an Al alloy, NiP plated Al, glass, glass ceramic, and/or combinations thereof. In block 404, the process provides a W pre-seed layer (e.g., pre-seed layer 304) on the substrate. In one embodiment, the W pre-seed layer may be made of about 95 or more atomic percent of W. In one embodiment, the W pre-seed layer has a resistivity of about $12 \times 10^{-8}$ Ω·m (at 20° C.) or lower. In one example, the thickness of the W pre-seed layer may be less than about 14 nm. In block 406, the process provides additional layers (e.g., one or more layers of an SUL, seed layer, interlayer, underlayer, MRL, overcoat layer, and lubricant layer) of the magnetic recording medium on the pre-seed layer.

Figure 5:
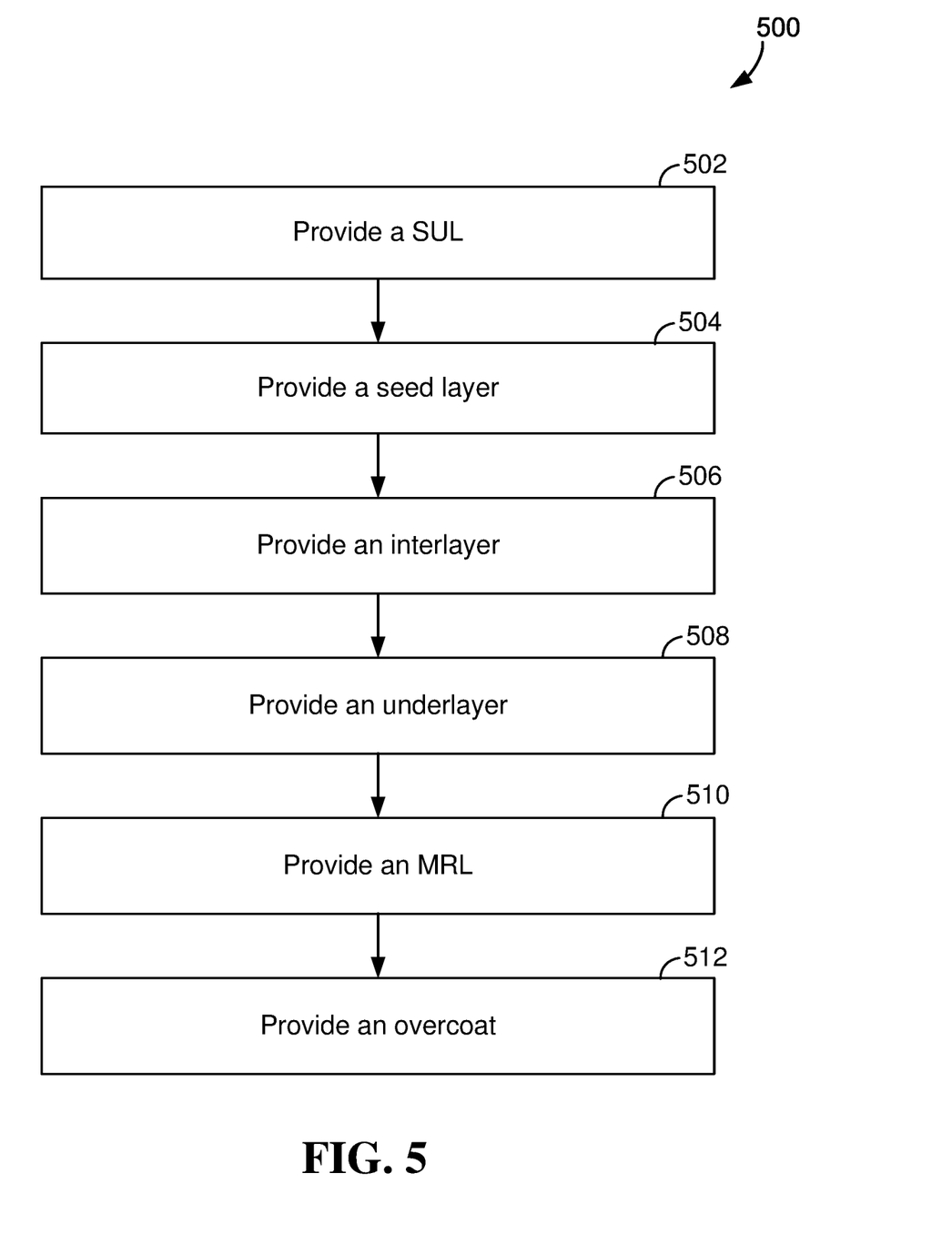
FIG. 5 is a flowchart illustrating a process for fabricating additional layers on a pre-seed layer of the magnetic recording medium described above in relation to FIG. 3.

FIG. 5 is a flowchart illustrating a process 500 for fabricating additional layers of the magnetic recording medium described above in relation to FIG. 3. In block 502, the process can provide an SUL (e.g., amorphous SUL 306) on the W pre-seed layer. In block 504, the process can provide a seed layer (e.g., seed layer 308) on the SUL. In block 506, the process can provide an interlayer (e.g., interlayer 310) on the seed layer. In block 508, the process can provide an underlayer (e.g., underlayer 312) on the interlayer. In block 510, the process can provide a magnetic recording layer (e.g., MRL 314) on the underlayer. In one embodiment, the magnetic recording layer may include one or more magnetic recording layers for storing data magnetically, for example, PMR, SMR, MAMR, and HAMR. In block 512, the process can provide an overcoat layer (e.g., overcoat 316) on the MRL.

Figure 6:
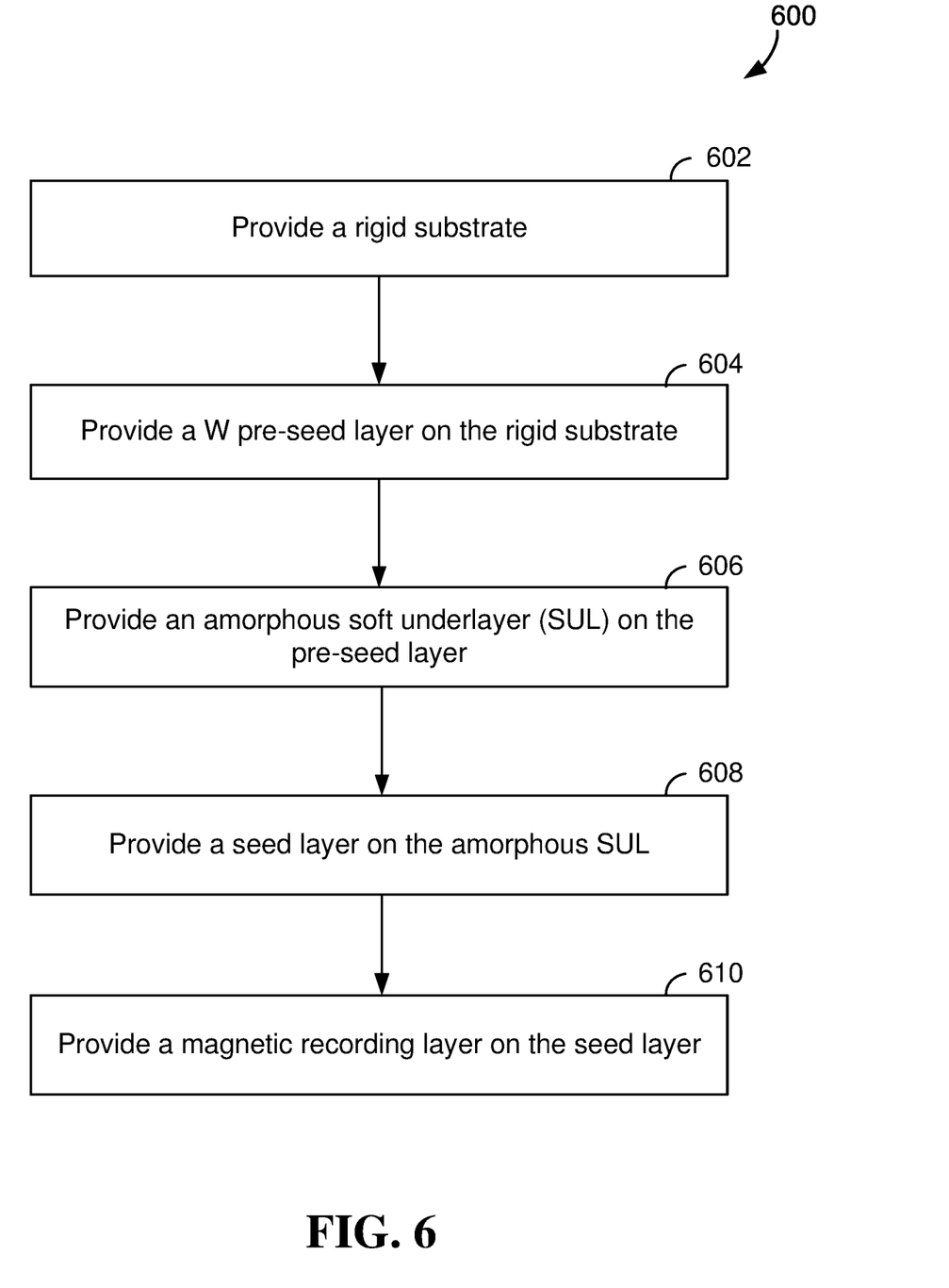
FIG. 6 is a flowchart illustrating a method for fabricating magnetic recording media with a W pre-seed layer in accordance with some aspects of the disclosure.

FIG. 6 is a flowchart illustrating a method 600 for fabricating a magnetic recording medium with a W pre-seed layer in accordance with an embodiment. In one aspect, the method 600 can be performed using the system 1100 described below to fabricate the magnetic storage medium described above in relation to FIG. 3. In some aspects, the fabricated medium may be used in the data storage device 100 of FIG. 1.

In block 602, the method provides a rigid substrate. For example, the rigid substrate may be the substrate 302 of the magnetic recording medium 300 of FIG. 3. In block 604, the method provides a pre-seed layer on the rigid substrate. The pre-seed layer may be made of W, for example, with 95 or more atomic percent of W. In one example, the W pre-seed layer may be the pre-seed layer 304 of the magnetic recording medium 300 of FIG. 3. The method can place the substrate in a deposition apparatus 1102 (see FIG. 11) to deposit the pre-seed layer on the substrate. In one embodiment, a resistivity of the pre-seed layer is $12 \times 10^{-8}$ Ω·m or less. In one embodiment, a thickness of the pre-seed layer is less than 30 nm (e.g., less than about 14 nm). In one embodiment, a conductance of the pre-seed layer with a first thickness is configured to be higher than a conductance of a CrTi pre-seed layer with the first thickness. The conductance of the pre-seed layer is determined based on the material composition (e.g., W or CrTi) and thickness of the pre-seed layer. In one embodiment, the pre-seed layer includes at least 95 atomic percent of W.

In block 606, the method provides an amorphous SUL on the pre-seed layer. In one example, the amorphous SUL may be the SUL 306 of the magnetic recording medium 300 of FIG. 3. In some examples, the amorphous SUL includes no Cr (chromium). The method can use the deposition apparatus 1102 to deposit the amorphous SUL on the pre-seed layer.

In block 608, the method provides a seed layer on the amorphous SUL. In one example, the seed layer may be the seed layer 308 of the magnetic recording medium 300 of FIG. 3. The method can use the deposition apparatus 1102 to deposit seed layer on the amorphous SUL.

In block 610, the method provides a magnetic recording layer on the seed layer. The method can use the deposition apparatus 1102 to deposit the magnetic recording layer on the seed layer. In one example, the magnetic recording layer may be the MRL 314 of the magnetic recording medium 300 of FIG. 3. In some embodiments, the method 600 can provide one or more layers (e.g., seed layer, interlayer, underlayer) between the magnetic recording layer and the pre-seed layer. In one embodiment, the amorphous SUL includes CoFe, and one or more elements selected from the group consisting of Mo, Nb, Ta, W, B, Zr, and combinations thereof.

Figure 7:
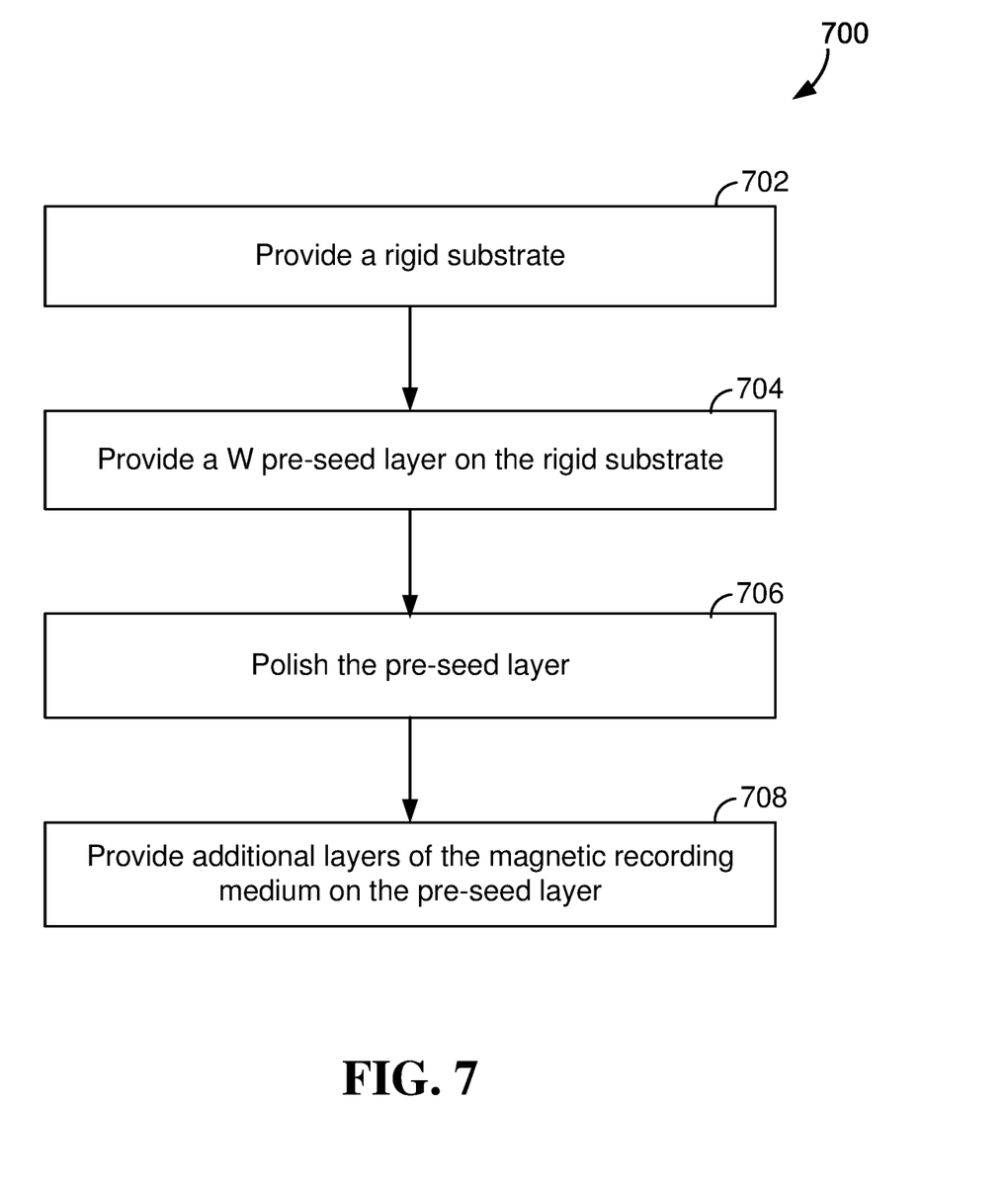
FIG. 7 is a flowchart illustrating a process for fabricating a magnetic recording medium with a polished pre-seed layer made of W in accordance with some aspects of the disclosure.

FIG. 7 is a flowchart illustrating a process 700 for fabricating a magnetic recording medium with a polished W pre-seed layer in accordance with some aspects of the disclosure. In one aspect, the process 700 can be used or modified to fabricate the medium described above in relation to FIG. 3. In some aspects, the fabricated magnetic recording medium may be used in the data storage device 100 of FIG. 1.

In block 702, the process provides a rigid substrate (e.g., rigid substrate 302). In some aspects, the substrate can be made of one or more materials such as an Al alloy, NiP plated Al, glass, glass ceramic, and/or combinations thereof. In block 704, the process provides a W pre-seed layer (e.g., W pre-seed layer 304) on the substrate. In one embodiment, the W pre-seed layer may be made of about 95 or more atomic percent of W. In one embodiment, the W pre-seed layer has a resistivity of about $12 \times 10^{-8}$ $\Omega \cdot m$ (at 20° C.) or lower. In one example, the thickness of the W pre-seed layer may be less than about 14 nm.

In block 706, the process polishes the W pre-seed layer. In one aspect, for example, the pre-seed layer can be plasma-polished. Polishing can reduce the roughness of the surface of the pre-seed layer. Roughness reduction of the pre-seed layer can lead to improved crystallographic texture of subsequently deposited media films (e.g., seed layer, interlayer, underlayer, and magnetic recording layer) on the pre-seed layer, and consequently, to increased recording performance of the media. In particular, media SNR, linear recording density, and areal recording density or areal density capacity (ADC) can be improved. Polishing may also serve to reduce head-to-media spacing (HMS) and enhance corrosion resistance of the magnetic recording media.

In block 708, the process provides additional layers (e.g., one or more layers of an SUL, seed layer, interlayer, underlayer, MRL, overcoat, and lubricant layer) of the magnetic recording medium on the W pre-seed layer. In one embodiment, the process can use the process 500 described above to deposit the additional layers on the pre-seed layer.

Figure 8:
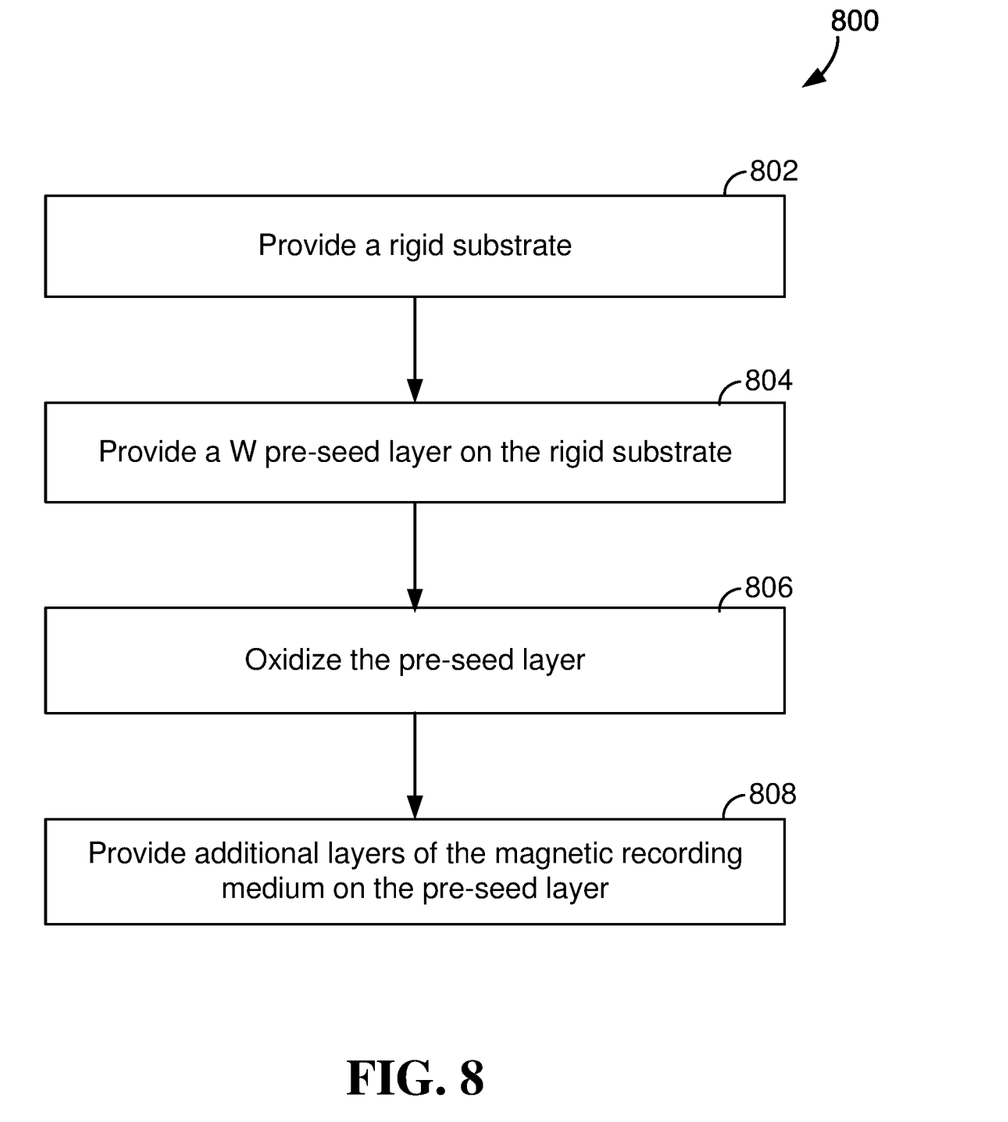
FIG. 8 is a flowchart illustrating a process for fabricating a magnetic recording medium with an oxidized pre-seed layer made of W in accordance with some aspects of the disclosure.

FIG. 8 is a flowchart illustrating a process 800 for fabricating a magnetic recording medium with an oxidized pre-seed layer made of W in accordance with some aspects of the disclosure. In one aspect, the process 800 can be used or modified to fabricate the magnetic storage medium described above in relation to FIG. 3. In some aspects, the fabricated medium may be used in the data storage device 100 of FIG. 1.

In block 802, the process provides a rigid substrate (e.g., rigid substrate 302). In some aspects, the substrate can be made of one or more materials such as an Al alloy, NiP plated Al, glass, glass ceramic, and/or combinations thereof. In block 804, the process provides a W pre-seed layer (e.g., pre-seed layer 304) on the substrate. In one embodiment, the W pre-seed layer may be made of about 95 or more atomic percent of W. In one embodiment, the W pre-seed layer has a resistivity of about $12 \times 10^{-8}$ $\Omega \cdot m$ (at 20° C.) or lower. In one example, the thickness of the W pre-seed layer may be less than about 14 nm.

In block 806, the process oxidizes the W pre-seed layer. Accordingly, following oxidation, at least the top surface of the pre-seed layer has at least some oxidized forms of its constituent metal compounds. For example, oxidation of the pre-seed layer can be used to improve recording performance. In some aspects, the oxidation of the pre-seed layer is provided by an amount sufficient to reduce an amount of intermixing between the pre-seed layer and the SUL to improve recording performance. In one example, the SUL moment of magnetization (Ms) can become higher and media orientation can be improved. The increase of Ms of SUL contributes to an increase of OW2 of the media, wherein OW2 (which sometimes may be referred to as "write-ability overwrite" or "reverse overwrite") is a measure of perpendicular overwrite (e.g., a measure of how much of an old signal remains in the recording medium after a new write signal is applied). In some examples, a Polar Kerr analysis of SUL/magnetic seed layer stack indicates Ms is increased from 319 emu/cc when deposited on top of unoxidized pre-seed to 344 emu/cc when deposited on top of oxidized pre-seed. In some examples, a Polar Kerr analysis of SUL/magnetic seed layer stack indicates Ms when deposited on top of oxidized pre-seed is thus increased by 5-10% from the Ms value when deposited on top of unoxidized pre-seed.

In block 808, the process provides additional layers (e.g., one or more layers of an SUL, seed layer, interlayer, underlayer, MRL, overcoat layer, and lubricant layer) of the magnetic recording medium on the W pre-seed layer. In one embodiment, the process can use the process 500 described above to deposit the additional layers on the pre-seed layer.

Figure 9:
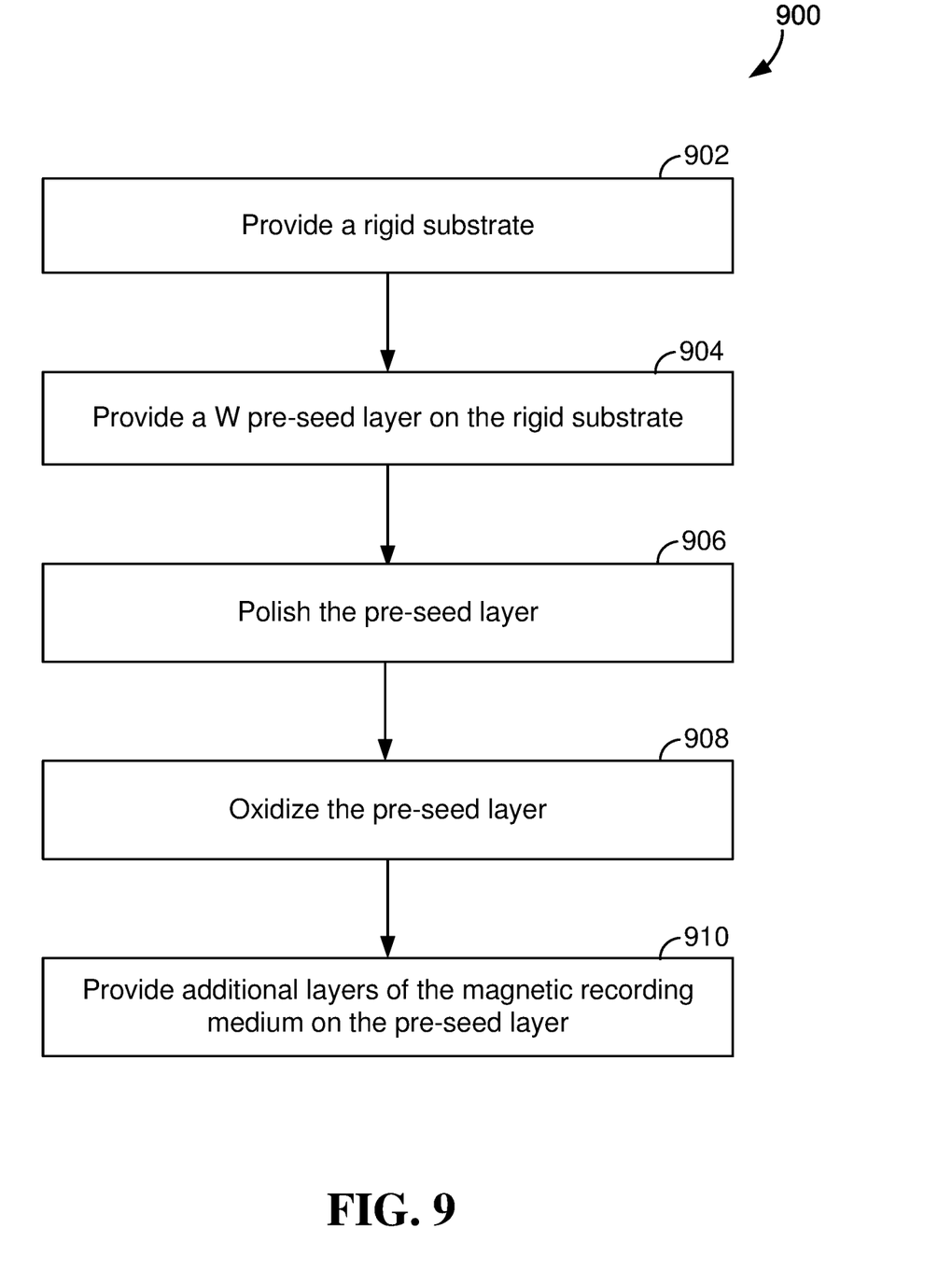
FIG. 9 is a flowchart illustrating a process for fabricating a magnetic recording medium with a polished and oxidized pre-seed layer made of W in accordance with some aspects of the disclosure.

In some aspects, the magnetic recording medium 300 may be provided with a polished and oxidized pre-seed layer. FIG. 9 is a flowchart illustrating a first process 900 for fabricating a magnetic recording medium with a polished and oxidized W pre-seed layer in accordance with some aspects of the disclosure. In one aspect, the process 900 can be used or modified to fabricate the magnetic storage medium described above in relation to FIG. 3. In some aspects, the fabricated medium may be used in the data storage device 100 of FIG. 1.

In block 902, the process provides a rigid substrate (e.g., rigid substrate 302). In some aspects, the substrate can be made of one or more materials such as an Al alloy, NiP plated Al, glass, glass ceramic, and/or combinations thereof. In block 904, the process provides a W pre-seed layer (e.g., pre-seed layer 304) on the substrate. In one embodiment, the pre-seed layer may be made of about 95 or more atomic percent of W. In one embodiment, the W pre-seed layer has a resistivity of about $12 \times 10^{-8}$ $\Omega \cdot m$ (at 20° C.) or lower. In one example, the thickness of the W pre-seed layer may be less than about 14 nm.

In block 906, the process polishes the W pre-seed layer. As described above, polishing can reduce the roughness of the pre-seed layer, which can lead to improved crystallographic texture of subsequently deposited media films (e.g., seed layer, interlayer, underlayer, and magnetic recording layer) on the pre-seed layer, and consequently, to increased recording performance of the media. In block 908, the process oxidizes the W pre-seed layer. As stated above, oxidation of the pre-seed layer can improve recording performance of the magnetic recording medium. In some aspects, the oxidation of the pre-seed layer is provided by an amount sufficient to reduce an amount of intermixing between the pre-seed layer and the SUL to improve recording performance. In one example, the SUL moment of magnetization (Ms) can become higher and media orientation can be improved. The increase of Ms of SUL contributes to an increase of OW2 of the media. Combining polishing and oxidation of the pre-seed layer can further improve recording performance of the magnetic recording medium than using only polishing or oxidation.

In block 910, the process provides additional layers (e.g., one or more layers of an SUL, seed layer, interlayer, underlayer, MRL, overcoat layer, and lubricant layer) of the magnetic recording medium on the W pre-seed layer. In one embodiment, the process can use the process 500 described above to deposit the additional layers on the W pre-seed layer.

Figure 10:
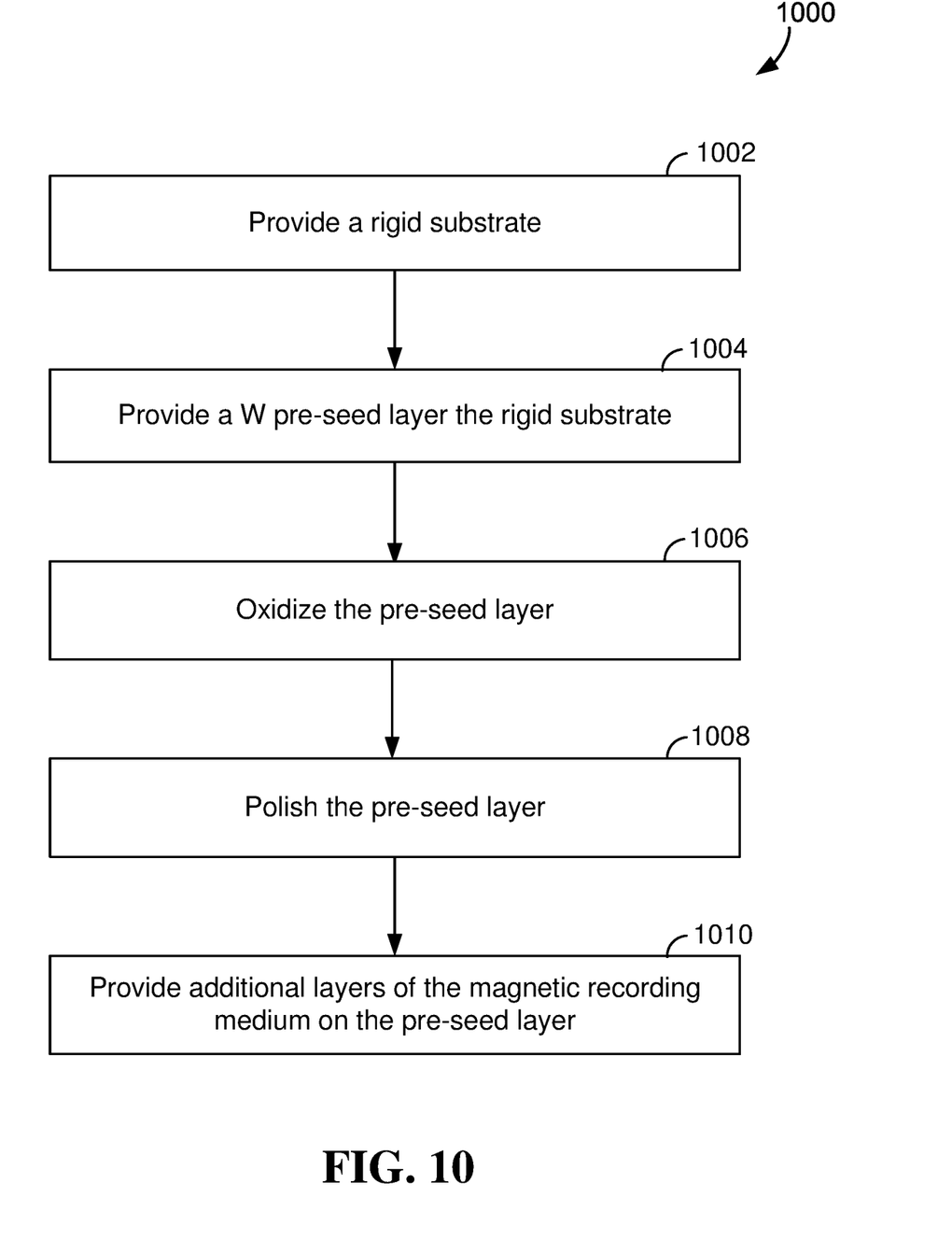
FIG. 10 is a flowchart illustrating a process for fabricating a magnetic recording medium with an oxidized and polished pre-seed layer made of W in accordance with some aspects of the disclosure.

FIG. 10 is a flowchart illustrating a process 1000 for fabricating a magnetic recording medium with an oxidized and polished W pre-seed layer in accordance with some aspects of the disclosure. In one aspect, the process 1000 can be used or modified to fabricate the magnetic storage medium described above in relation to FIG. 3. In some aspects, the fabricated medium may be used in the data storage device 100 of FIG. 1. This process 1000 is different from the process 900 above in the order of oxidizing and polishing a pre-seed layer.

In block 1002, the process provides a rigid substrate (e.g., rigid substrate 302). In some aspects, the substrate can be made of one or more materials such as an Al alloy, NiP plated Al, glass, glass ceramic, and/or combinations thereof. In block 1004, the process provides a W pre-seed layer (e.g., pre-seed layer 304) on the substrate. In one embodiment, the W pre-seed layer may be made of about 95 or more atomic percent of W. In one embodiment, the W pre-seed layer has a resistivity of about $12 \times 10^{-8}$ $\Omega \cdot m$ (at 20° C.) or below. In one example, the thickness of the W pre-seed layer may be less than about 14 nm.

In block 1006, the process oxidizes the W pre-seed layer. As stated above, oxidation of the pre-seed layer can improve recording performance of the magnetic recording medium. In some aspects, the oxidation of the pre-seed layer is provided by an amount sufficient to reduce an amount of intermixing between the pre-seed layer and the SUL to improve recording performance. In one example, the SUL moment of magnetization (Ms) can become higher and media orientation can be improved. The increase of Ms of SUL contributes to an increase of OW2 of the media. Combining polishing and oxidation of the pre-seed layer can further improve recording performance of the magnetic recording medium. In block 1008, the process polishes the W pre-seed layer. As described above, polishing can reduce the roughness of the pre-seed layer that can lead to improved crystallographic texture of subsequently deposited media films (e.g., seed layer, interlayer, underlayer, and magnetic recording layer) on the pre-seed layer, and consequently, to increased recording performance of the media.

The order of polishing and oxidation can be determined by the convenience of operation and the smoothness that can be achieved during polishing. These two processes can be conducted sequentially or simultaneously. If a sequential process with polishing followed by oxidation is employed, the conditions of polishing and oxidation can be controlled to provide the desired combination of smoothness and level of oxidation to maximize the recording performance and corrosion resistance of the magnetic recording media. If a sequential process with oxidation followed by polishing is utilized, the oxidation and polishing conditions can be selected so that not all oxidized portions of the pre-seed layer are removed during polishing. If a simultaneous process is chosen, a selected amount of oxygen can be used as the sole gas or introduced as a secondary gas in addition to other gas or gases, e.g., krypton or other inert gases, during the polishing process to achieve oxidation while polishing.

In block 1010, the process provides additional layers (e.g., one or more layers of an SUL, seed layer, interlayer, underlayer, MRL, overcoat layer, and lubricant layer) of the magnetic recording medium on the W pre-seed layer. In one embodiment, the process can use the process 500 described above to deposit the additional layers on the W pre-seed layer.

Figure 11:
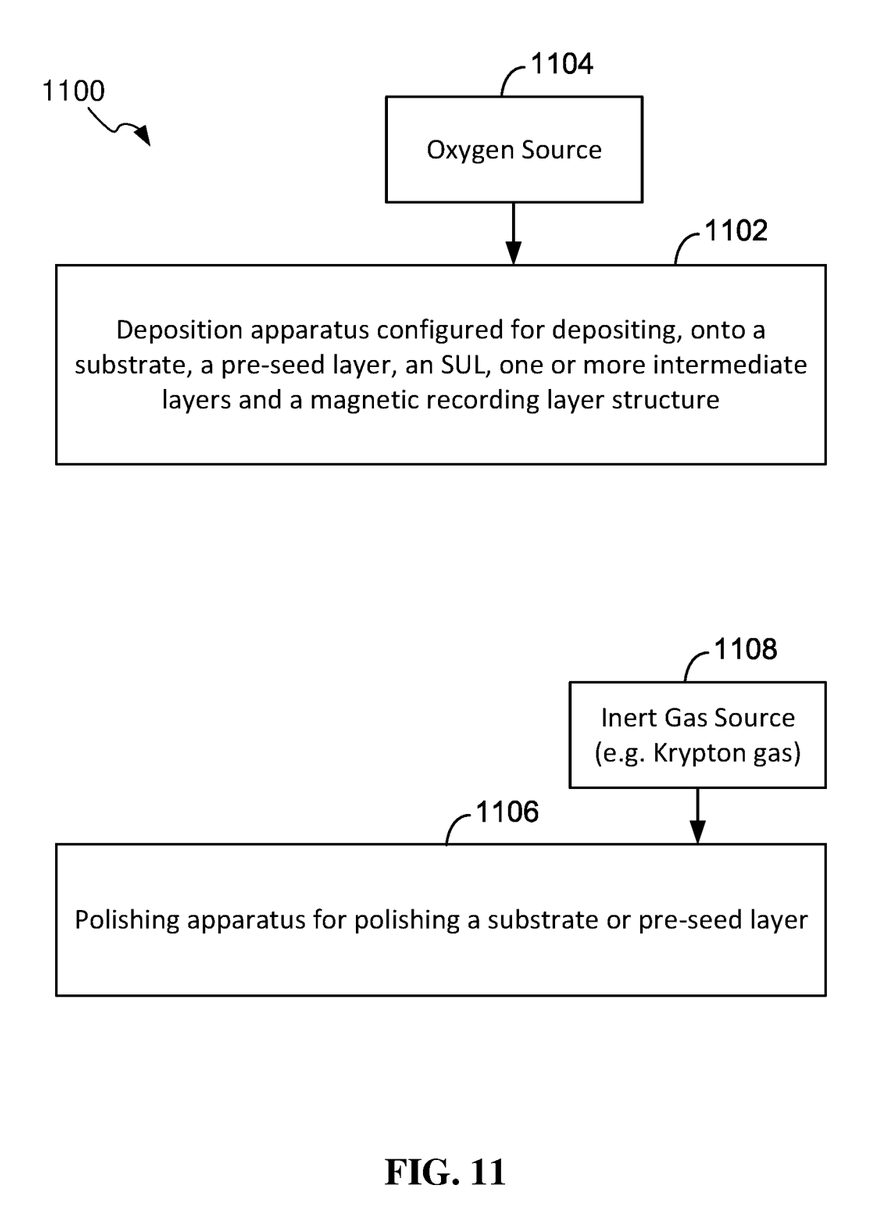
FIG. 11 illustrates an overall system for fabricating a magnetic recording medium with a pre-seed layer made of W in accordance with some aspects of the disclosure.

FIG. 11 illustrates an overall system 1100 that may be used to deposit various layers on a substrate to form a magnetic recording medium and to selectively polish and/or oxidize a substrate or a layer (e.g., pre-seed layer) on the substrate. Briefly, the system 1100 includes a deposition apparatus 1102 configured for depositing, onto a substrate (e.g., substrate 302), a pre-seed layer and additional layers of the magnetic recording media 300. The deposition apparatus 1102 may be, for example, configured to perform one or more of: PVD, DC magnetron sputter deposition, ion beam deposition, radio frequency sputter deposition, or CVD, including PECVD, LPCVD, and ALCVD. The deposition apparatus 1102 may include one or more individual apparatus stations, components, or systems for depositing different layers. One example of such deposition system is 200 Lean of Intevac, Inc. With the system of FIG. 11, any of the methods of FIGS. 4-10 may be performed to fabricate the medium of FIG. 3 by inserting the substrate into the deposition apparatus 1102 and controlling the deposition apparatus 1102 to deposit a W pre-seed layer and other layers on the pre-seed layer.

The system 1100 may include an oxygen source 1104. Oxygen can be introduced into a deposition chamber of the deposition apparatus 1102 while the W pre-seed layer is being formed (or after it is formed) so as to oxidize the pre-seed layer. In one embodiment, the deposition apparatus 1102 can deposit a W pre-seed layer in the presence of oxygen supplied by the oxygen source 1104 to oxidize the pre-seed layer by some desired amount (which may be controlled by the amount of oxygen admitted into the chamber and other factors such as deposition temperature, etc.). In one example, where the deposition apparatus is a DC magnetron apparatus operating at a temperature of 50 degree Celsius, the oxygen source is configured to provide a flow of oxygen into the deposition apparatus in a duration that is set to generate a thickness of the oxidized metal within the pre-seed layer and/or an oxygen concentration in the oxidized metal within the pre-seed layer such that an areal density capacity (ADC) of the magnetic recording medium is at least 0.5% greater than an ADC for a corresponding magnetic recording medium with a pre-seed layer that is not oxidized. The oxygen source 1104 is then shut off and other components (such as a vacuum pump, not shown) can be used to flush the oxygen from the deposition chamber of the deposition apparatus 1102 and create a vacuum therein (if appropriate for depositing the remaining layers). In some examples, inert gases may be introduced into the chamber (if appropriate for depositing the remaining layers). Hence, in some examples, the deposition of the pre-seed layer can be selectively performed in the presence of both the inert gas and the oxygen.

The system 1100 may include a polishing apparatus 1106 that includes or consists of a modified carbon etching/deposition apparatus configured without a carbon source so as to generate an inert gas plasma (without carbon particles) for polishing a substrate or pre-seed layer (or other structure or layer). In this regard, a carbon etching/deposition apparatus ordinarily includes a cathode (with a source of carbon material), an anode, and a plasma generation system within a sealed chamber. These components are configured and controlled so that, in use, carbon particles are emitted from the cathode and travel within the ignited plasma in the chamber and accelerate toward the anode, upon which a structure to be coated or etched is positioned (such as a substrate). The carbon particles strike (or bombard or impinge upon) the structure and deposit a carbon coating onto the target structure or, if the apparatus is so configured, leave an etched pattern. Magnetic containment components may be provided to contain the plasma and guide the carbon particles in a controlled manner within the chamber.

The polishing apparatus 1106 may be a modified version of such an apparatus, which is modified to omit the carbon source from the cathode and to inject an inert gas into its chamber using an inert gas source 1108 (such as a source of krypton gas) for use in polishing a structure (such as a pre-seed layer on a substrate). In use, when the plasma is ignited, the inert gas atoms and ions are accelerated toward the structure to be polished, which may be adjacent to the anode. The inert gas atoms and ions strike (or bombard or impinge upon) the structure and thereby polish the structure by knocking off (or otherwise dislodging) atoms, particles, or other material from the surface of the structure, such as atoms, particles or material that juts out from the surface (and hence contributes to a rough surface). The bias voltage between the plasma generating source and substrate and/or the voltage between the anode and cathode can be controlled to select or adjust the amount of polishing to be performed to achieve a desired smoothness or roughness, such as a surface smoothness or roughness below of predetermined smoothness or roughness threshold. For example, a higher magnitude bias voltage and/or voltage may be used to perform a "strong" polish, whereas a lower magnitude bias voltage and/or voltage may be used to perform a "mid-level" polish. Additionally or alternatively, the amount of time the polish is applied can be adjusted to control the amount of polishing, or the plasma density can be adjusted to control the amount of polishing. Alternatively, a DC magnetron (which uses a target) may be used to polish the structure (although, with a DC magnetron some unwanted particles or materials from the target may be deposited on the structure being polished). RF sputter station or other plasma systems may be used as well, as long as they can be adapted to smoothen the surface.

In one embodiment, the polishing apparatus 1106 can be controlled to polish the W pre-seed layer (e.g., pre-seed layer 304) to the desired smoothness. The substrate (with the smoothened pre-seed layer) is then transferred back to the deposition apparatus 1102 to deposit the additional layers (e.g., one or more layers of an SUL, seed layer, interlayer, underlayer, MRL, overcoat layer, and lubricant layer) of the magnetic recording medium. In other examples, if the deposition apparatus is suitably-equipped, the polishing may be performed within the same deposition apparatus that deposits the pre-seed layer and other layers.

In one aspect, each of the above-described processes can perform the sequence of actions in a different order. In another aspect, each process can skip one or more of the actions. In other aspects, one or more of the actions are performed simultaneously. In some aspects, additional actions can be performed.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a rigid substrate;
   a pre-seed layer on the rigid substrate, the pre-seed layer comprising W and an oxide of W, wherein a resistivity of the pre-seed layer is $12\times10^{-8}$ ohm meter ($\Omega \cdot m$) or less, and the pre-seed layer comprises at least 95 atomic percent of W;
   an amorphous soft magnetic underlayer (SUL) on the pre-seed layer;
   a seed layer on the amorphous SUL; and
   a magnetic recording layer (MRL) on the seed layer.

2. The magnetic recording medium of claim 1, wherein a thickness of the pre-seed layer is less than 30 nanometers (nm).

3. The magnetic recording medium of claim 2, wherein a thickness of the pre-seed layer is 14 nm or less.

4. The magnetic recording medium of claim 1, wherein a conductance of the pre-seed layer with a first thickness is configured to be higher than a conductance of a pre-seed layer comprising Cr and Ti with the first thickness.

5. The magnetic recording medium of claim 1, wherein the amorphous SUL comprises CoFe, and one or more elements selected from the group consisting of Mo, Nb, Ta, W, B, Zr, and combinations thereof.

6. The magnetic recording medium of claim 5, wherein the amorphous SUL does not include Cr.

7. A data storage device, comprising:
   a slider comprising a magnetic head; and
   the magnetic recording medium of claim 1,
   wherein the slider is configured to write information to the magnetic recording layer of the magnetic recording medium.

8. A method for manufacturing a magnetic recording medium, the method comprising:
   providing a rigid substrate;
   providing a pre-seed layer on the rigid substrate, the pre-seed layer comprising W and an oxide of W, wherein a resistivity of the pre-seed layer is $12\times10^{-8}$ ohm meter ($\Omega \cdot m$) or less, and the pre-seed layer comprises at least 95 atomic percent of W;
   providing an amorphous soft magnetic underlayer (SUL) on the pre-seed layer;
   providing a seed layer on the amorphous SUL; and
   providing a magnetic recording layer (MRL) on the seed layer.

9. The method of claim 8, further comprising, at least one of:
   polishing the pre-seed layer; or
   oxidizing the pre-seed layer.

10. The method of claim 8, further comprising:
polishing the pre-seed layer; and
oxidizing the pre-seed layer after polishing the pre-seed layer.

11. The method of claim 8, further comprising:
oxidizing the pre-seed layer; and
polishing the pre-seed layer after the oxidizing the pre-seed layer.

12. The method of claim 8, wherein a thickness of the pre-seed layer is less than 30 nanometers (nm).

13. The method of claim 12, wherein a thickness of the pre-seed layer is 14 nm or less.

14. The method of claim 8, wherein a conductance of the pre-seed layer with a first thickness is configured to be higher than a conductance of a pre-seed layer comprising Cr and Ti with the first thickness.

15. The method of claim 8, wherein the pre-seed layer comprises at least 95 atomic percent of W.

16. The method of claim 8, wherein the amorphous SUL comprises Co, Fe, and one or more elements selected from the group consisting of Mo, Nb, Ta, W, B, Zr, and combinations thereof.

17. The method of claim 16, wherein the amorphous SUL does not include Cr.

* * * * *